US007583704B1

(12) United States Patent
Walker et al.

(10) Patent No.: US 7,583,704 B1
(45) Date of Patent: Sep. 1, 2009

(54) SYNCHRONIZING SEPARATED UPSTREAM AND DOWNSTREAM CHANNELS OF CABLE MODEM TERMINATION SYSTEMS

(76) Inventors: Carl Walker, 11 Samantha's Way, Wilton, NH (US) 03086-5738; David Fox, 99 Fox Run Rd., Bolton, MA (US) 01740; Achot Matevossian, 22 Eldorado Rd., Chelmsford, MA (US) 01824; Michael Healy, 111 Lyman Rd., Berlin, MA (US) 01503

( * ) Notice: Subject to any disclaimer, the term of this patent is extended or adjusted under 35 U.S.C. 154(b) by 987 days.

(21) Appl. No.: 10/459,136

(22) Filed: Jun. 10, 2003

(51) Int. Cl.
*H04J 3/06* (2006.01)
(52) U.S. Cl. ............... 370/503; 370/352; 725/111; 725/114; 725/144; 725/71
(58) Field of Classification Search ........... 370/503, 370/352, 350, 353, 354, 356; 375/222, 257; 725/63, 64, 65, 66, 67, 702, 71, 111, 114, 725/144
See application file for complete search history.

(56) References Cited

U.S. PATENT DOCUMENTS

| | | |
|---|---|---|
| 4,977,593 A | 12/1990 | Balance |
| 5,153,763 A | 10/1992 | Pidgeon |
| 5,604,735 A | 2/1997 | Levinson et al. |
| 5,724,510 A | 3/1998 | Arndt et al. |
| 5,784,597 A | 7/1998 | Chiu et al. |
| 5,805,602 A | 9/1998 | Cloutier et al. |
| 5,918,019 A | 6/1999 | Valencia |
| 5,931,954 A | 8/1999 | Hoshina et al. |
| 5,933,420 A | 8/1999 | Jaszewski et al. |
| 5,963,557 A | 10/1999 | Eng |
| 6,023,769 A | 2/2000 | Gonzalez |
| 6,078,595 A | 6/2000 | Jones et al. |
| 6,101,180 A | 8/2000 | Donahue et al. |

(Continued)

FOREIGN PATENT DOCUMENTS

WO 0072509 11/2000

(Continued)

OTHER PUBLICATIONS

Data-Over-Cable Service Interface Specifications Superseded Radio Frequency Interface Specification SP-RFIv1.1-I06-001215, Copyright 1999, 2000 Cable Television Laboratories, Inc.

(Continued)

*Primary Examiner*—Huy D. Vu
*Assistant Examiner*—Dady Chery
(74) *Attorney, Agent, or Firm*—Stolowitz Ford Cowger LLP

(57) ABSTRACT

Methods and devices are provided for allowing upstream and downstream cable modem termination systems to be located in different physical locations. According to some embodiments of the invention, a downstream CMTS is located at a head end of a cable network and an upstream CMTS is located in each of a plurality of hubs in a cable network. Such a configuration provides more flexibility than prior art systems, especially when much of the traffic passing through the downstream CMTS is broadcast traffic, such as IP video, that will be passed to multiple hubs. Such configurations are more economical because they do not require every hub to have its own downstream CMTS. In preferred embodiments, the upstream and downstream functions are synchronized using a Global Positioning System ("GPS") reference source.

26 Claims, 9 Drawing Sheets

U.S. PATENT DOCUMENTS

| | | | |
|---|---|---|---|
| 6,137,793 A | 10/2000 | Gorman et al. | |
| 6,233,246 B1 | 5/2001 | Hareski et al. | |
| 6,275,990 B1 | 8/2001 | Dapper et al. | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,487,512 B1* | 11/2002 | Tursich | 702/89 |
| 6,490,727 B1 | 12/2002 | Nazarathy et al. | |
| 6,510,162 B1 | 1/2003 | Fijolek et al. | |
| 6,516,345 B1 | 2/2003 | Kracht | |
| 6,542,754 B1* | 4/2003 | Sayers et al. | 455/502 |
| 6,546,017 B1 | 4/2003 | Khaunte | |
| 6,556,591 B2 | 4/2003 | Bernath et al. | |
| 6,640,248 B1 | 10/2003 | Jorgensen | |
| 6,665,611 B1 | 12/2003 | Oran et al. | |
| 6,693,878 B1 | 2/2004 | Daruwalla et al. | |
| 6,697,970 B1 | 2/2004 | Chisolm | |
| 6,698,022 B1* | 2/2004 | Wu | 725/111 |
| 6,754,210 B1* | 6/2004 | Ofek | 370/389 |
| 6,760,316 B1* | 7/2004 | Hebsgaard et al. | 370/324 |
| 6,763,019 B2 | 7/2004 | Mehta et al. | |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,819,682 B1 | 11/2004 | Rabenko et al. | |
| 6,847,635 B1 | 1/2005 | Beser | |
| 6,847,691 B2* | 1/2005 | Torikoshi et al. | 375/354 |
| 6,853,680 B1 | 2/2005 | Nikolich | |
| 6,857,132 B1 | 2/2005 | Rakib et al. | |
| 6,901,079 B1 | 5/2005 | Phadnis et al. | |
| 6,950,399 B1 | 9/2005 | Bushmitch et al. | |
| 6,959,042 B1 | 10/2005 | Liu et al. | |
| 6,993,016 B1 | 1/2006 | Liva et al. | |
| 6,996,129 B2 | 2/2006 | Krause et al. | |
| 7,007,296 B2 | 2/2006 | Rakib et al. | |
| 7,023,882 B2 | 4/2006 | Woodward, Jr. et al. | |
| 7,035,251 B2* | 4/2006 | Hebsgaard et al. | 370/352 |
| 7,039,049 B1 | 5/2006 | Akgun et al. | |
| 7,065,779 B1* | 6/2006 | Crocker et al. | 725/111 |
| 7,067,734 B2 | 6/2006 | Abe et al. | |
| 7,068,597 B1 | 6/2006 | Fijolek et al. | |
| 7,113,484 B1 | 9/2006 | Chapman et al. | |
| 7,116,643 B2 | 10/2006 | Huang et al. | |
| 7,117,526 B1 | 10/2006 | Short | |
| 7,139,923 B1 | 11/2006 | Chapman et al. | |
| 7,145,887 B1 | 12/2006 | Akgun | |
| 7,149,223 B2 | 12/2006 | Liva et al. | |
| 7,161,945 B1 | 1/2007 | Cummings | |
| 7,164,690 B2 | 1/2007 | Limb et al. | |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1 | 10/2007 | Kumar | |
| 7,305,460 B2 | 12/2007 | Park | |
| 7,359,332 B2 | 4/2008 | Kolze et al. | |
| 7,363,629 B2 | 4/2008 | Springer et al. | |
| 2001/0005361 A1* | 6/2001 | Lipsanen | 370/238 |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0026643 A1* | 2/2002 | Ewen et al. | 725/109 |
| 2002/0052927 A1 | 5/2002 | Park | |
| 2002/0067721 A1 | 6/2002 | Kye | |
| 2002/0073432 A1 | 6/2002 | Kolze | |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2002/0144284 A1 | 10/2002 | Burroughs et al. | |
| 2002/0146010 A1 | 10/2002 | Shenoi et al. | |
| 2002/0147978 A1* | 10/2002 | Dolgonos et al. | 725/62 |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0058794 A1 | 3/2003 | Pantelias et al. | |
| 2003/0058893 A1* | 3/2003 | Dworkin et al. | 370/503 |
| 2003/0061415 A1 | 3/2003 | Horton et al. | |
| 2003/0066087 A1 | 4/2003 | Sawyer et al. | |
| 2003/0067944 A1 | 4/2003 | Sala et al. | |
| 2003/0214943 A1 | 11/2003 | Engstrom et al. | |
| 2003/0214982 A1 | 11/2003 | Lorek et al. | |
| 2004/0045037 A1 | 3/2004 | Cummings et al. | |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0160945 A1 | 8/2004 | Dong et al. | |
| 2004/0163129 A1 | 8/2004 | Chapman et al. | |
| 2004/0181800 A1 | 9/2004 | Rakib et al. | |
| 2004/0244043 A1 | 12/2004 | Lind et al. | |
| 2004/0248530 A1 | 12/2004 | Rakib et al. | |
| 2005/0018677 A1 | 1/2005 | Enns et al. | |
| 2005/0122976 A1 | 6/2005 | Poli et al. | |
| 2005/0138669 A1 | 6/2005 | Baran | |
| 2005/0198684 A1 | 9/2005 | Stone et al. | |
| 2005/0201399 A1 | 9/2005 | Woodward, Jr. et al. | |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |
| 2005/0265397 A1 | 12/2005 | Chapman et al. | |
| 2005/0265398 A1 | 12/2005 | Chapman et al. | |
| 2005/0289623 A1 | 12/2005 | Midani et al. | |
| 2006/0002294 A1 | 1/2006 | Chapman et al. | |
| 2006/0126660 A1 | 6/2006 | Denney et al. | |
| 2006/0159100 A1 | 7/2006 | Droms et al. | |
| 2006/0168612 A1 | 7/2006 | Chapman et al. | |
| 2007/0274345 A1 | 11/2007 | Taylor et al. | |
| 2008/0037545 A1 | 2/2008 | Lansing et al. | |

FOREIGN PATENT DOCUMENTS

| | | |
|---|---|---|
| WO | 2005117310 | 12/2005 |
| WO | 2005117358 | 12/2005 |

OTHER PUBLICATIONS

U.S. Office Action, Mailed Nov. 21, 2007 for U.S. Appl. No. 10/874,510.

Ramakrishnan, Sangeeta, "Next Generation Edge—Realizing the vision of shared resources and bandwidth", date unknown, 16 pgs.

Cisco Systems, Inc., "Downstream External PHY Interface Specification", SP-DEPI-W2-041101A.DOC, EDCS-408926, date unknown.

Chapman, John T., "Remote PHY Technical White Paper Addendum," Downstream External PHY Interface Specification, Cisco Systems, Inc., EDCS-377253, date unknown.

Chapman, John T., "CMTS Remote PHY for a DOCSIS Network: DMPI Over IP Protocol Specification", RP-SP-DoIP-D1-040715B. doc, Cisco Systems, Inc., EDCS-387722, May 26, 2004.

Postel, J., "User Datagram Protocol", RFC 768, Aug. 28, 1980, 3 pgs.

Postel, Jon, Editor, "DARPA Internet Program Protocol Specification", RFC 791, Sep. 1981, 45 pages.

Deering, S., "Host Extensions for IP Multicasting", RFC 1112, Aug. 1989.

Droms, R., "Dynamic Host Configuration Protocol", RFC 2131, Mar. 1997.

Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 488 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, © 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC 3315, Jul. 2003.

Droms, R., "Stateless Dynamic Host Configuration Protocol (DHCP) Service for IPv6", RFC 3736, Apr. 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Lau, J., et al., "Layer Two Tunneling Protocol—Version 3 (L2TPv3)," RFC 3931, Mar. 2005, 94 pages.

Aboba, et al. Extensible Authentication Protocol (EAP), RFC 3748, Jun. 2004, pp. 1-64, Standards Track.

ITU-T Telecommunications Standardization Sector of ITU, Series J: Cable Networks And Transmission of Television, Sound Programme and other Multimedia Signals, Interactive Systems for Gigital Television Distribution, Recommendation J. 122, Dec. 2002, 506 pages, International Telecommunications Union.

Cable Television Laboratories, Inc., "DOCSIS Radio Frequency Interfaces Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs-Research, pp. 1-13.

Data Over Cable Service Interface Specification, Aug. 4, 1997.

Ethereal: Display Filter Reference: DOCSIS Upstream Channel Descriptor, Webarchivedate Apr. 27, 2004.

DOCSIS Set Top Gateway (DSG) interface specification, Feb. 28, 2002.

An Overview of Internet Protocols, Dann, Jan. 1998.

Patrick, M.; RFC3046-DHCP Rely Agent Information Option; The Internet Society (2001) http://www.faqs.org/rfcs/rfc3046.html; Jan. 2001; 11 pages.

Cable Television Laboratories, Inc., Interim Specification, Data-Over-Cable Service Interface Specifications, Radio Frequency Specification, SP-RFIv1.1-I02-990731, Jul. 30, 1999, 353 pages.

Cable Television Laboratories, Inc., Interim Specification, Data-Over-Cable Service Interface Specifications, Radio Frequency Interface Specification, SP-RFIv1.1-I04-000407, Apr. 7, 2000, 376 pages.

3COM, High-Speed Cable Internet Solutions, http://www.3com.com/cablenow/pdf/7125dsht.pdf, Dec. 1999, 4 pages.

Phuc H. Tran, USPTO Office Action Paper No.20080427, May 1, 2008, 10 pages.

U.S. Patent Application 11/292,725, Bernstein et al., "Adavanced Multicast Support for Cable", filed Dec. 1, 2005.

Thompson, et al. IPv6 Stateless Address Autoconfiguration, RFC 2462, Dec. 1998, pp. 1-24, Network Working Group.

Thompson, et al. IPv6 Stateless Address Autoconfiguration, RFC 4862, Sep. 2007, pp. 1-29, Network Working Group.

Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.

* cited by examiner

| Field Description | Bit Length | Notes |
|---|---|---|
| Start Bit | 1 | Logic 0 |
| DOCSIS Timestamp | 32 | Sent MSB first |
| Input 'A' fault | 1 | 1 = fault |
| Input 'B' fault | 1 | 1 = fault |
| Timing Master | 1 | 1 = this station is timing master |
| Timestamp Invalid | 1 | 1 = invalid |
| RESERVED | 4 | Send as 0, ignore on receive |
| Regenerator Hop count | 4 | Each clock regenerator adds 4'b0001 to this field |
| RESERVED | 4 | Send as 0, ignore on receive |
| Message CRC | 8 | Polynomial |
| Stop bits | 2 | Logic 1 |

SYNCHRONIZING SEPARATED UPSTREAM AND DOWNSTREAM CHANNELS OF CABLE MODEM TERMINATION SYSTEMS

BACKGROUND OF THE INVENTION

1. Field of the Invention

The present invention generally relates to access data networks that use at least one shared access communication channel to communicate between a plurality of nodes in the network and a terminal to which the plurality of nodes is connected. More specifically, the present invention is intended for synchronizing multiple cable modem termination systems.

2. Description of Related Art

Broadband access technologies such as cable, fiber optic, and wireless have made rapid progress in recent years. There has been a convergence of voice, video, and data networks, which is due in part to the deregulation of the telecommunications industry in the United States. In order to stay competitive, companies offering broadband access technologies need to support voice, video, and other high-bandwidth applications over their local access networks.

One type of broadband access technology relates to cable modem networks. A cable modem network or "cable plant" employs cable modems, which are an advancement of conventional PC data modems and provide high speed connectivity.

FIG. 1 shows a block diagram of a two-way hybrid fiber-coaxial (HFC) cable network 100. As shown in FIG. 1, the cable network 100 includes a head end complex 102. The head end complex 102 may include a plurality of components and/or systems (not shown) such as, for example, a head end, a super head end, a hub, a primary hub, a second hub, etc.

Additionally, as shown in FIG. 1, the head end complex 102 includes cable modem termination system ("CMTS") 120. Primary functions of CMTS 120 include: (1) receiving data inputs from external sources (such as Internet 122 and satellite system 124); (2) converting the data for transmission over the cable plant; (3) providing appropriate Media Access Control (MAC) level packet headers for data received by the cable system; and (4) modulating and demodulating the data to and from the cable network. Typically, the head end complex 102 is configured to provide a communication interface between nodes (e.g. cable modems) in the cable network and external networks such as, for example, the Internet 122. The cable modems typically reside at the subscriber premises 110A-D.

Existing CMTS devices integrate both upstream channels 126 (for data received from, e.g., subscribers' cable modems) and downstream channels 128 (for data received from, e.g., the Internet 122 or a satellite system 124). Such integration may be accomplished, for example, by including both channels on the same line card. This is desirable, since the downstream provides the timing and control information required for the operation of the upstream.

If the upstream and downstream CMTS could be separated, then much greater flexibility could be achieved and costs could be reduced. Such configurations would allow traffic from the Internet, satellites, etc., passing through a single downstream CMTS to be passed to multiple hubs.

SUMMARY OF THE INVENTION

Methods and devices are provided for allowing for multiple cable modem termination systems to act in concert with each other, by sharing the same timing information. The invention also provides for the possibility of having the systems located in different physical locations. According to some embodiments of the invention, a downstream CMTS is located at a head end of a cable network and an upstream CMTS is located in each of a plurality of hubs in a cable network. Such a configuration provides more flexibility than prior art systems, especially when much of the traffic passing through the downstream CMTS is broadcast traffic, such as IP-based or streaming video, that will be passed to multiple hubs. Such configurations are more economical because they do not require every hub to have its own downstream CMTS. In preferred embodiments, the upstream and downstream functions are synchronized using a Global Positioning System ("GPS") reference source.

According to some implementations of the invention, methods are provided for synchronizing components of a cable network. The method includes the following steps: receiving, at a head end of the cable network, global positioning system data that includes GPS time of day and frequency information; and forming a DOCSIS time stamp based on the GPS time information.

The method may also include the step of using the GPS frequency information to synchronize modulation of downstream symbol data. The modulation synchronizing step may be performed by a modulator located in a head end of the cable network. The modulation synchronizing step may be performed by a modulator located in a hub of the cable network. The method can include the step of transmitting the downstream data to a hub via an optical fiber network or via an Internet Protocol network.

The method also includes the synchronization of DOCSIS timestamp information between the various upstream and downstream CMTS systems.

The method includes the steps of: receiving, at a hub of the cable network, a DOCSIS time stamp based on GPS time and frequency information; and synchronizing downstream data based on the DOCSIS time stamp. The DOCSIS time stamp may be transmitted to the hub of the cable network from a head end of the cable network across an Internet Protocol network.

The method includes the following steps: receiving, at a cable modem termination system in a hub of the cable network, upstream data from a plurality of cable modems; translating time data obtained from a GPS receiver located in the hub of the cable network into DOCSIS time.

Some embodiments of the invention provide a hub of a cable network. The hub includes: a diplexer for receiving upstream data from a plurality of cable modems, for receiving downstream data from a head end of the cable network and for transmitting the downstream data to the plurality of cable modems; a GPS receiver for receiving GPS data, including GPS time and frequency data; and an upstream cable modem termination system for receiving only the upstream data from the diplexer, for receiving the GPS time data, for translating the GPS time data into DOCSIS time data and for including DOCSIS time stamps in the upstream data.

Alternative embodiments of the invention provide a head end of a cable network. The head end includes: a router for receiving downstream data from the Internet and for receiving upstream data from a plurality of cable modems; a GPS receiver for receiving GPS data, including GPS time and frequency reference data; and a downstream cable modem termination system for receiving downstream data from the router, for receiving the GPS time data, for translating the GPS time data into DOCSIS time data and for including DOCSIS time stamps in the downstream data.

Some embodiments of the invention provide an upstream cable modem termination system that includes: a first port for receiving only upstream data from at least one cable modem; a second port for receiving GPS time and frequency data from a GPS receiver; and a clock card for translating the GPS time data into DOCSIS time data. The clock card may be a master clock card configured to send DOCSIS time stamps to slave clock cards of other upstream cable modem termination systems.

Other embodiments of the invention provide a downstream cable modem termination system that includes: a first port for receiving downstream data; a second port for receiving GPS time and frequency data from a GPS receiver; and a clock card for translating the GPS time data into DOCSIS time data and for including DOCSIS time stamps in the downstream data.

Yet other embodiments of the invention provide an apparatus for synchronizing components of a cable network, including: a device configured for receiving, at a head end of the cable network, global positioning system data that includes GPS time of day and frequency information; and a device for forming a DOCSIS time stamp based on the GPS time information. The apparatus may also include a synchronizing device for using the GPS frequency information to synchronize modulations of downstream data. The synchronizing device may be located in a head end of the cable network or in a hub of the cable network.

Still other embodiments of the invention provide a computer program embodied in a machine-readable medium. The computer program causes a cable network to do the following: receive, at a head end of the cable network, global positioning system data that includes GPS time of day and frequency information; and form a DOCSIS time stamp based on the GPS time information. The computer program may also cause the cable network to transmit the GPS frequency information to a modulator and control the modulator to use the GPS frequency information to synchronize modulation of downstream symbol data.

The modulator may be located in a head end of the cable network or in a hub of the cable network. The computer program may cause the cable network to transmit the downstream data to a hub via an optical fiber network or an Internet Protocol network.

BRIEF DESCRIPTION OF THE DRAWINGS

The invention may best be understood by reference to the following description taken in conjunction with the accompanying drawings, which are illustrative of specific embodiments of the present invention.

FIG. 9 illustrates the format of a DOCSIS time stamp according to one implementation of the invention.

DETAILED DESCRIPTION OF SPECIFIC EMBODIMENTS

Referring again to FIGS. 1 through 3, network 100 will be described in further detail. Although network 100 is conventional in the sense that CMTS 120 includes both upstream and downstream functions, network 100 is not necessarily conventional in other respects.

Head end complex 102 is connected to one or more fiber nodes 106 in the cable network. Each fiber node is, in turn, configured to service one or more subscriber groups 110. Each subscriber group typically comprises about 500 to 2000 subscribers, which may be businesses, households, etc. A primary function of the fiber nodes 106 is to provide an optical-electronic signal interface between the head end complex 102 and the plurality of cable modems residing at the plurality of subscriber groups 110.

In order for data to be able to be transmitted effectively over a wide area network such as HFC or other broadband computer networks, a common standard for data transmission is typically adopted by network providers. A commonly used and well-known standard for transmission of data or other information over HFC networks is the Data Over Cable System Interface Specification ("DOCSIS"). The evolving DOCSIS standard has been publicly presented by Cable Television Laboratories, Inc. (Louisville, Colo.), in various documents entitled, e.g., DOCSIS 1.1 RF Interface Specification (document control number SP-RFIv1.1-I06-001215, Dec. 15, 2000) and "Recommendation J.122," the DOCSIS 2.0 specification. These documents are incorporated herein by reference for all purposes.

However, the present invention is not limited to data transmissions that use the DOCSIS standard. Any convenient standard may be used, depending upon various factors that include the type of data network used to implement the present invention.

Figure 1:
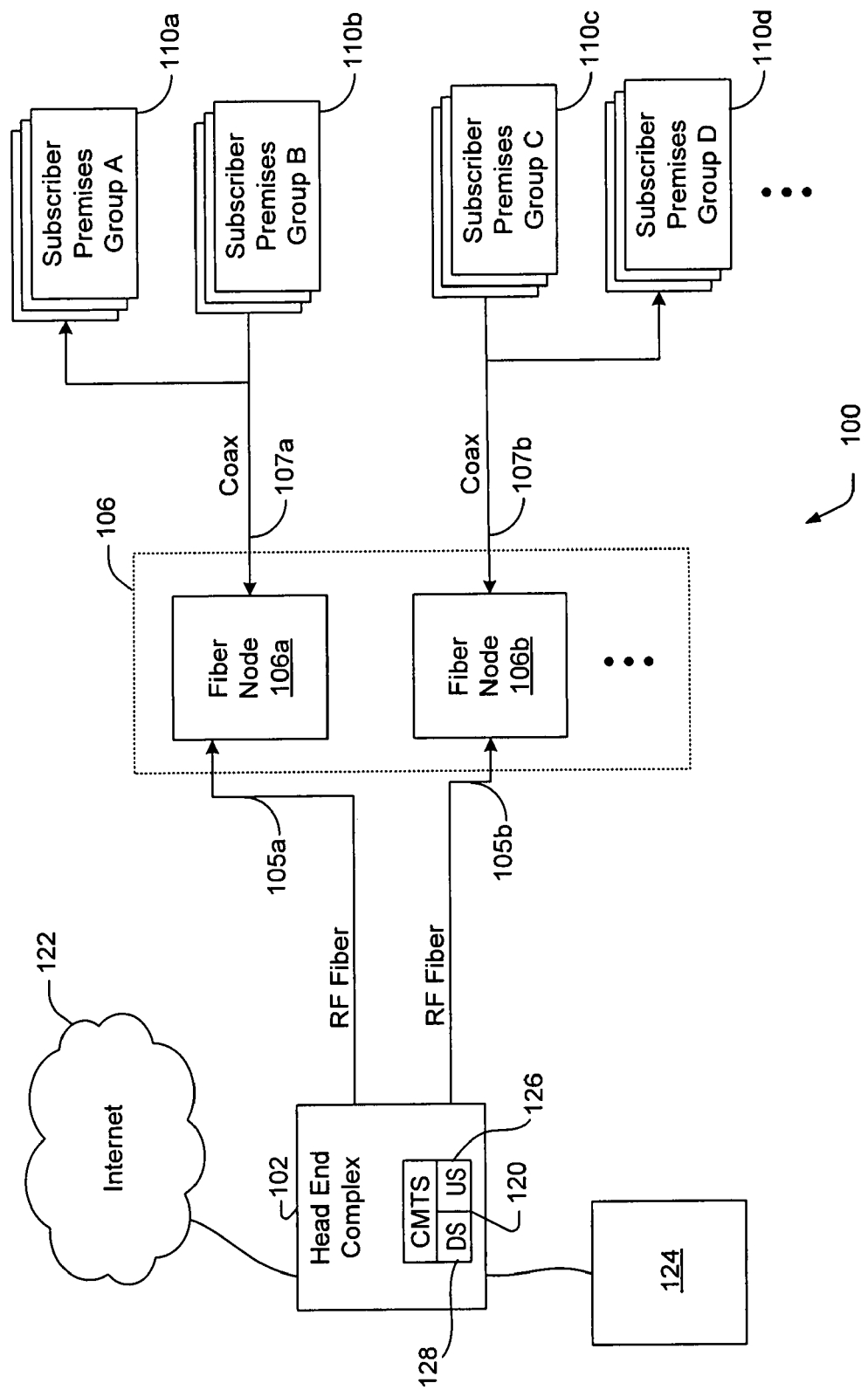
FIG. 1 is a block diagram that illustrates a cable network.

Communication between head end complex 102 and fiber node 106a is implemented using modulated optical signals that travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the head end complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems residing at subscriber premises 110A-D. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems of subscriber premises groups 110 to transmit data to the CMTS, the cable modems share one or more upstream channels within that domain. Access to an upstream channel is normally controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem sends its data at the requested time. "Time" in this context may be tracked using a counter, commonly referred to as a timestamp counter. According to current implementations, a timestamp counter is a 32-bit counter that increments by one every 10.240 MHz clock pulse.

In many embodiments, digital data on upstream and downstream channels of the cable network are carried over radio frequency ("RF") carrier signals. Cable modems convert digital data (e.g., from a computer) to a modulated RF signal for upstream transmission and convert downstream RF signals to digital form. The conversion is done at a subscriber's facility. At CMTS 120, the conversions are reversed. CMTS 120 converts downstream digital data to a modulated RF signal, which is carried over the fiber and coaxial lines to the subscriber premises. The cable modem then demodulates the RF signal and feeds the digital data to a computer. On the return path, the digital data are fed to the cable modem (from an associated PC, for example), which converts it to a modulated RF signal. Once CMTS 120 receives the upstream RF signal, it demodulates the signal and transmits the digital data to an external source.

As will be explained in more detail below, preferred embodiments of the present invention include CMTSs that are dedicated to handle either upstream traffic or downstream traffic, but not necessarily both. For example, a single downstream CMTS may distribute downstream data to a plurality of hubs. Each hub may have an upstream CMTS that forwards upstream data from cable modems, but which does not necessarily send the downstream data to the CM.

Figure 2:
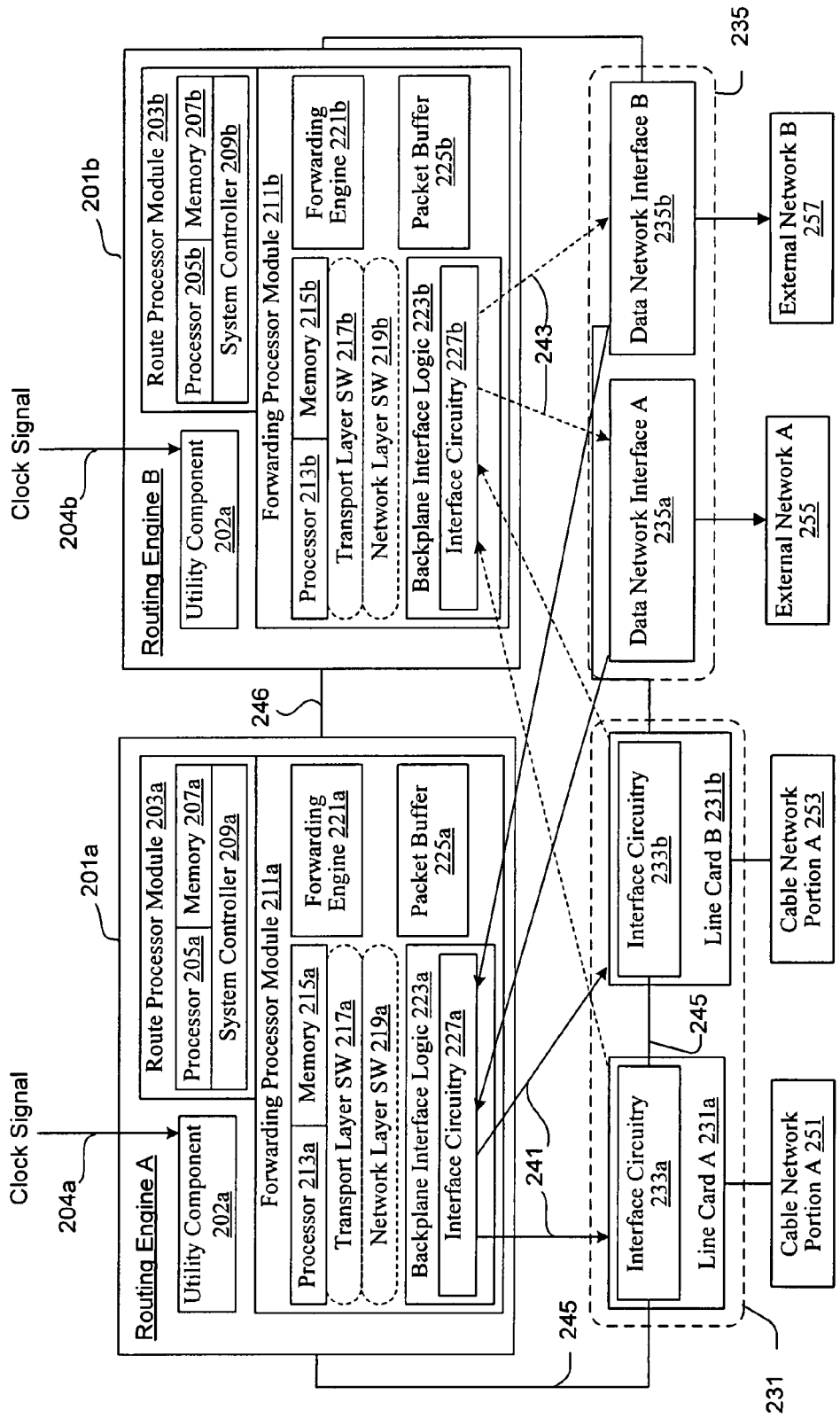
FIG. 2 is a block diagram that illustrates a cable modem termination system.

FIG. 2 shows a block diagram of CMTS 200. CMTS 200 may incorporate various novel features including the subjects of pending patent applications assigned to Cisco Systems, Inc. CMTS 200 combines upstream and downstream functions in the same CMTS, a feature made unnecessary due to the methods and devices of the present invention. However, according to some embodiments of the present invention, a "legacy" CMTS having both upstream and downstream functionality may be modified (e.g., by adding a GPS input interface) to perform some methods of the present invention. For example, a modified legacy CMTS could be used as an upstream CMTS—acting in concert with another system providing the downstream data, such as CMTS 444 of FIG. 4.

Routing Engine A may be configured or designed to include a plurality of functionally different modules or components, including, for example, a Forwarding Processor (FP) Module 211*a* adapted to provide packet forwarding functionality; a Route Processor (RP) Module 203*a* adapted to implement routing or forwarding operations; and a utility component 202*a* adapted to provide system clock and timestamp functionality. The routing engine components may be configured to provide layer one, layer two, layer three and layer four functionality as well as quality of service (QoS) functionality.

It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 207*a* may comprise synchronous dynamic random access memory (SDRAM) storage locations addressable by the processor 205*a* for storing software programs and data structures accessed by the components. A network routing operating system, portions of which may reside in memory and executed by the route processor, functionally organizes the router by invoking network operations in support of software processes executing on the router.

The plurality of line cards may include different types of line cards that have been specifically configured to perform specific functions. For example, line cards 231 may correspond to radio-frequency (RF) line cards that have been configured or designed for use in a cable network. Additionally, line cards 235 may correspond to network interface cards that have been configured or designed to interface with different types of external networks (e.g. WANs and/or LANS) utilizing different types of communication protocols (e.g. Ethernet, Frame Relay, ATM, TCP/IP, etc).

For example, the data network interface 235*a* functions as an interface component between external data sources and the cable system. The external data sources transmit data to the data network interface 235*a* via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 219*a*.

As shown in FIG. 2, at least a portion of the line cards includes interface circuitry for providing an appropriate interface between the host line card, other line cards, and/or the routing engine(s). For example, interface circuitry 233*a* may include interconnect ports coupled to one or more of the point-to-point links 241, 243. According to a specific implementation, the interface circuitry functions as a translator that converts conventional formats of data received at the line cards to a suitable protocol format for transmission from the line card to the appropriate routing engine.

Point-to-point links 241, 243 may be configured as clock forwarded links such that each point-to-point link comprises at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, each line card may be configured to provide at least one communication interface between the routing engines (201*a* and 201*b*) and a portion of the cable network. The data network interface 235*a* may couple the routing engine 201*a* to an external data network 255 such as, for example, the Internet.

Figure 3:
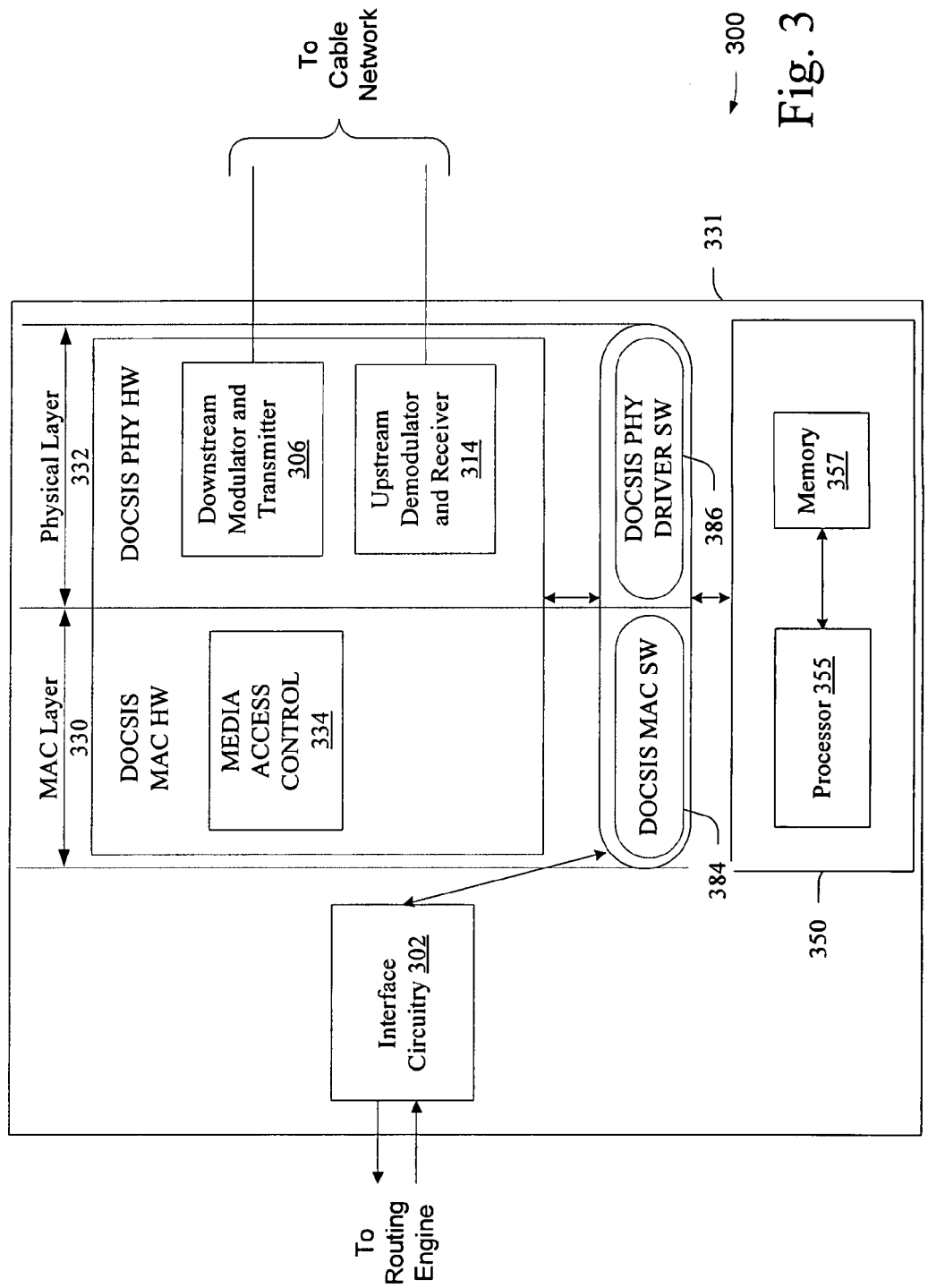
FIG. 3 is a block diagram that illustrates a line card.

FIG. 3 illustrates line card 300, which is suitable for a CMTS that includes both upstream and downstream functionality. Alternative embodiments for CMTSs that include only upstream or only downstream functions will be described below with reference to FIG. 4. Line card 300 may be configured or designed to implement selected aspects of the DOCSIS functionality that may otherwise be implemented by a CMTS, such as DOCSIS MAC functionality. Line card 300 provides functions on several network layers, including a physical layer 332, and a Media Access Control (MAC) layer 330.

In line card 300, the physical layer is responsible for receiving and transmitting RF signals on the cable plant. Hardware portions of the physical layer include at least one downstream modulator and transmitter 306 and/or at least one upstream demodulator and receiver 314. The physical layer also includes software 386 for driving the hardware components of the physical layer.

Upstream optical data signals (packets) arriving via an optical fiber node are converted to electrical signals, and then demodulated by the demodulator/receiver 314. The demodulated information is then passed to MAC layer block 330.

A primary purpose of MAC layer 330 is to encode, with MAC headers, downstream packets and decode, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to CMTS 120 (if sent upstream on a network such as network 100). Note that the cable modems also include MAC addressing components. In the cable modems, these components encapsulate upstream data with a header containing the MAC address of the CMTS.

MAC layer 330 includes a MAC hardware portion 334 and a MAC software portion 384. The MAC layer software portion may include software relating to DOCSIS MAC functionality, etc. The MAC layer hardware and software portions operate together to provide the above-described DOCSIS MAC functionality. In one embodiment, MAC controller 334 is dedicated to performing some MAC layer functions and is independent from the processor 355.

After MAC layer block 330 has processed the upstream information, it is then passed to interface circuitry 302. As described previously, interface circuitry 302 includes the appropriate hardware and/or software for converting data formats received at the line cards to a suitable protocol format for transmission from the line card to an appropriate routing engine.

When a packet is received from the routing engine at the interface circuitry 302, the packet is then passed to MAC layer 330. The MAC layer 330 transmits information via a one-way communication medium to downstream modulator and transmitter 306. Downstream modulator and transmitter 306 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data are likewise modulated using, for example, QAM16 or QSPK. According to a specific embodiment, the modulated data are converted from IF electrical signals to RF electrical signals (or vice-versa) using one or more electrical signal converters (not shown).

As shown in FIG. 3, line card 300 includes a central hardware block 350 including one or more processors 355 and memory 357. These hardware components interact with software and other hardware portions of the various layers within the line card. They provide general purpose computing power for much of the software. Memory 357 may include, for example, I/O memory (e.g. buffers), program memory, shared memory, etc. One or more data structures used for implementing the technique of the present invention may reside in a comparable memory of a CMTS having only upstream or downstream functionality, as described below with reference to FIG. 4. In one embodiment, the software entities 382, 384, and 386 are implemented as part of a network operating system running on hardware 350.

Figure 4:
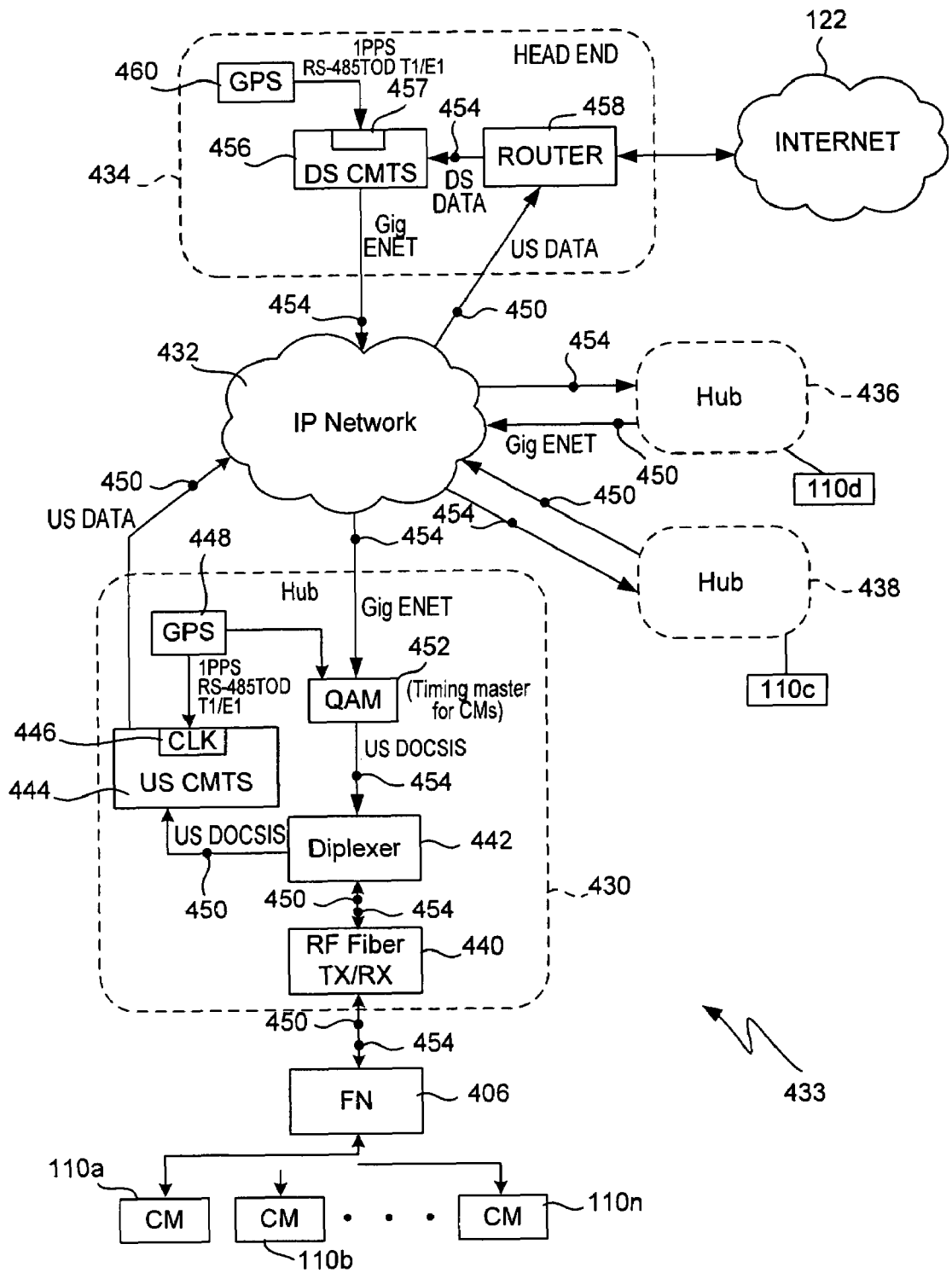
FIG. 4 is a block diagram that illustrates a cable network according to some aspects of the present invention.

FIG. 4 illustrates network 433 according to some embodiments of the present invention. An important feature of network 433 is that the upstream and downstream functions are performed by separate CMTSs. Network 433 includes hub 430, which communicates via network 432 with head end 434. Head end 434 receives data from an external source (Internet 122 in this example) for distribution as downstream data 454 to hubs 430, 436 and 438. Head end 434 includes router 458 for sending downstream data 454 from Internet 122 to downstream CMTS 456. Router 458 also receives upstream data 450, via network 432, from cable modems in subscriber premises groups 110. However, in this embodiment, downstream CMTS 456 does not receive upstream data 450. The upstream CMTS, however, receives DOCSIS "MAP" information from the downstream CMTS. This MAP information contains a copy of the information transmitted to a CM, and provides the upstream CMTS with information about the time and modulation type a CM has been granted transmission permission by the downstream CMTS.

Hub 430 includes transceiver 440, which communicates with fiber node 406 via RF signals across an optical fiber link. Diplexer 442 transmits downstream DOCSIS signals 454 to transceiver 440 and transmits upstream DOCSIS signals 450 to upstream CMTS 444. Accordingly, upstream CMTS 444 does not receive downstream DOCSIS signals 454. Although for the same of simplicity only one upstream CMTS is shown in hub 430, preferred embodiments of the invention include a plurality of upstream CMTSs in each hub.

Because upstream CMTS 444 and downstream CMTS 456 are physically separated, upstream and downstream traffic must be synchronized. Here, upstream and downstream traffic are synchronized by reference to time and frequency data from the Global Positioning System ("GPS"). GPS device 460 provides time data and clocking signals 457 to downstream CMTS 456. GPS device 448 provides time data and clocking signals 446 to upstream CMTS 444 and modulator 452, which is a quadrature amplitude modulator in this example. The GPS data provided to modulator 452 includes frequency data that are used by modulator 452 as described in the DOCSIS specifications.

Here, network 432 is an IP Network that supports Gigabit Ethernet traffic. In alternative embodiments, network 432 is another type of network, e.g., an optical fiber network. In some such embodiments, modulator 452 can be located in head end 434 and network 432 can transmit modulated RF signals to hubs 430, 436 and 438 for distribution to subscriber premises 110. In such embodiments, modulator 452 does not need to receive time information from a device such as GPS device 460

In this embodiment, clock cards 446 and 457 extract time and frequency data from GPS frames received from GPS devices 448 and 460, respectively. CMTS 444 and CMTS 456 output DOCSIS timestamps based on these data. The details of this process will be described below.

GPS device 448 or 460 may be, for example, a GPS receiver such as a Symmetricom Z3801A GPS receiver or a similar GPS device. In the example shown in FIG. 4, GPS devices 448 and 460 are transmitting time-of-day ("TOD") information via a serial interface using the RS-485 standard at a rate of 1 pulse per second.

GPS is a worldwide radio-navigation system formed from 24 GPS satellites and their ground stations. The ground stations monitor the GPS satellites and check both their status and their exact positions in space. A master ground station transmits corrections for the satellites' "ephemeris" (slight positional error) constants and clock offsets back to the satellites themselves. The satellites can then incorporate these updates in the signals they send to GPS receivers. The system was put in place by the U.S. Department of Defense, but aspects of the system are now widely used for non-military purposes.

Although the GPS system was developed in order to determine locations accurately, the GPS system also provides very precise time information, because developers of the GPS system realized from the outset that small errors in timing could introduce large errors in distance calculations for a GPS receiver. The timing of signals transmitted by GPS satellites is very precise, because these satellites include atomic clocks. GPS receivers synchronize their internal time and frequency reference with that of the atomic oscillator (normally a cesium based standard) located in the GPS spacecraft.

Civilian users worldwide may use the Standard Positioning Service ("SPS") without charge or restrictions. Most GPS receivers are capable of receiving and using the SPS signal.

Authorized users with cryptographic equipment, keys and specially equipped GPS receivers can use the Precise Positioning System ("PPS"). U.S. military personnel, certain U.S. Government agencies and selected other users approved by the U.S. Government may use the PPS. The PPS has the following predictable accuracies: 22 meters horizontal accuracy; about 28 meters vertical accuracy; and 200 nanoseconds time accuracy.

In other embodiments, upstream and downstream traffic are synchronized by reference to time data from another source, such as LORAN-C. This would require different receiving and processing equipment at the sites in question, but would also provide the required time transfer and clock oscillator discipline.

Figure 5:
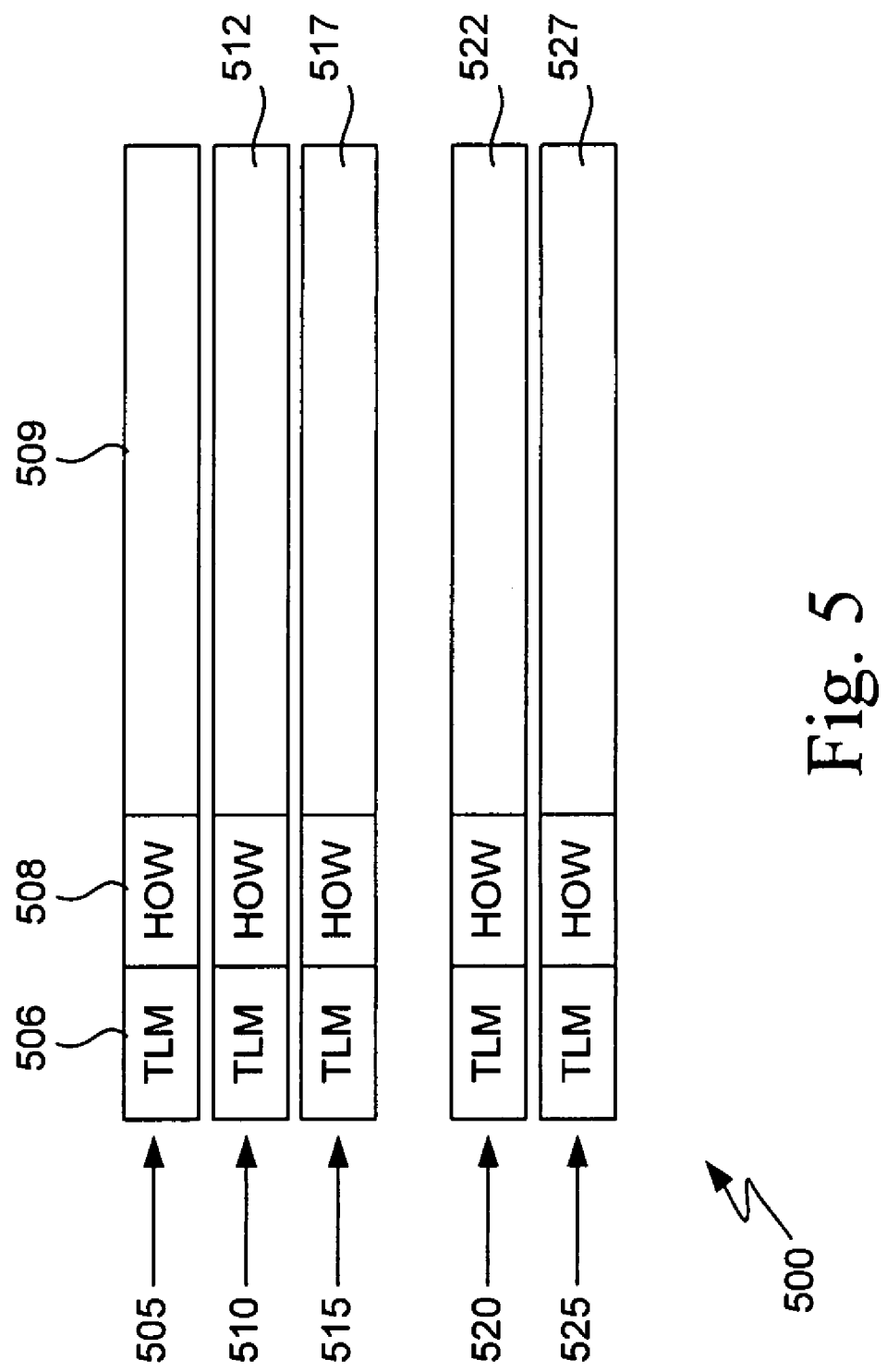
FIG. 5 illustrates the format of a GPS data frame.

FIG. 5 illustrates the structure of GPS data frame 500, which is also known as a GPS navigation message. Frame 500 is composed of subframes 505, 510, 515, 520 and 525. The GPS navigation message is a continuous 50 bits/second data stream modulated onto the carrier signal of every GPS satellite. Frame 500 is 1500 bits long, so takes 30 seconds to be transmitted. Every satellite begins to transmit a frame precisely on the minute and half minute, according to its own clock.

Each of subframes 505, 510, 515, 520 and 525 is divided into 10 words of 30 bits each. Six bits in each word are for parity. The remaining 24 data bits in words 3 through 10 will be referred to herein as "data content."

Each of subframes 505, 510, 515, 520 and 525 begins with telemetry word 506, followed by handover word 508. The first 8 bits in telemetry word 506 contain a "sync pattern," used by a GPS receiver to help synchronize itself with the Navigation Message and thus be able to correctly decode the data content. Handover word 508 contains a "truncated Z-count," which is the time according to the satellite's clock when the end of the subframe will be transmitted, with a scale factor of 6 seconds. The truncated Z-count may be considered a counter that is incremented in consecutive subframes. The full Z-count has a scale factor of 1.5 seconds and is one of the primary units for GPS time.

Subframes 505, 510 and 515 contain high-accuracy ephemeris and clock offset data. Field 509 of subframe 505 contains second-degree polynomial coefficients used to calculate a satellite's clock offset. Field 509 of subframe 505 also contains a clock offset time-of-applicability, which is the fit time for the second-degree polynomial. Fields 512 and 517 contain orbital parameters. New data for fields 509, 512 and 517 usually begin to be transmitted precisely on the hour.

Subframes 520 and 525 are "subcommutated, which means that consecutive subframes have different data content. These data repeat, but 25 consecutive frames of subframe 520 and 525 data must be collected before a GPS receiver has all of the unique data content being transmitted by a GPS satellite. A satellite transmits the same data content in subframes 520 and 525 until it is next uploaded, or usually for about 24 hours.

A typical GPS receiver is all-in-view, meaning it continuously attempts to track all satellites currently in view. A typical GPS receiver would continuously demodulate the Navigation Message data, looking for a change in the data content of subframe 505, 510 or 515. If the receiver detects a change, it collects a new subframe 505, 510 and 515 data set and begins using it to navigate and/or make a time correction.

Figure 6:
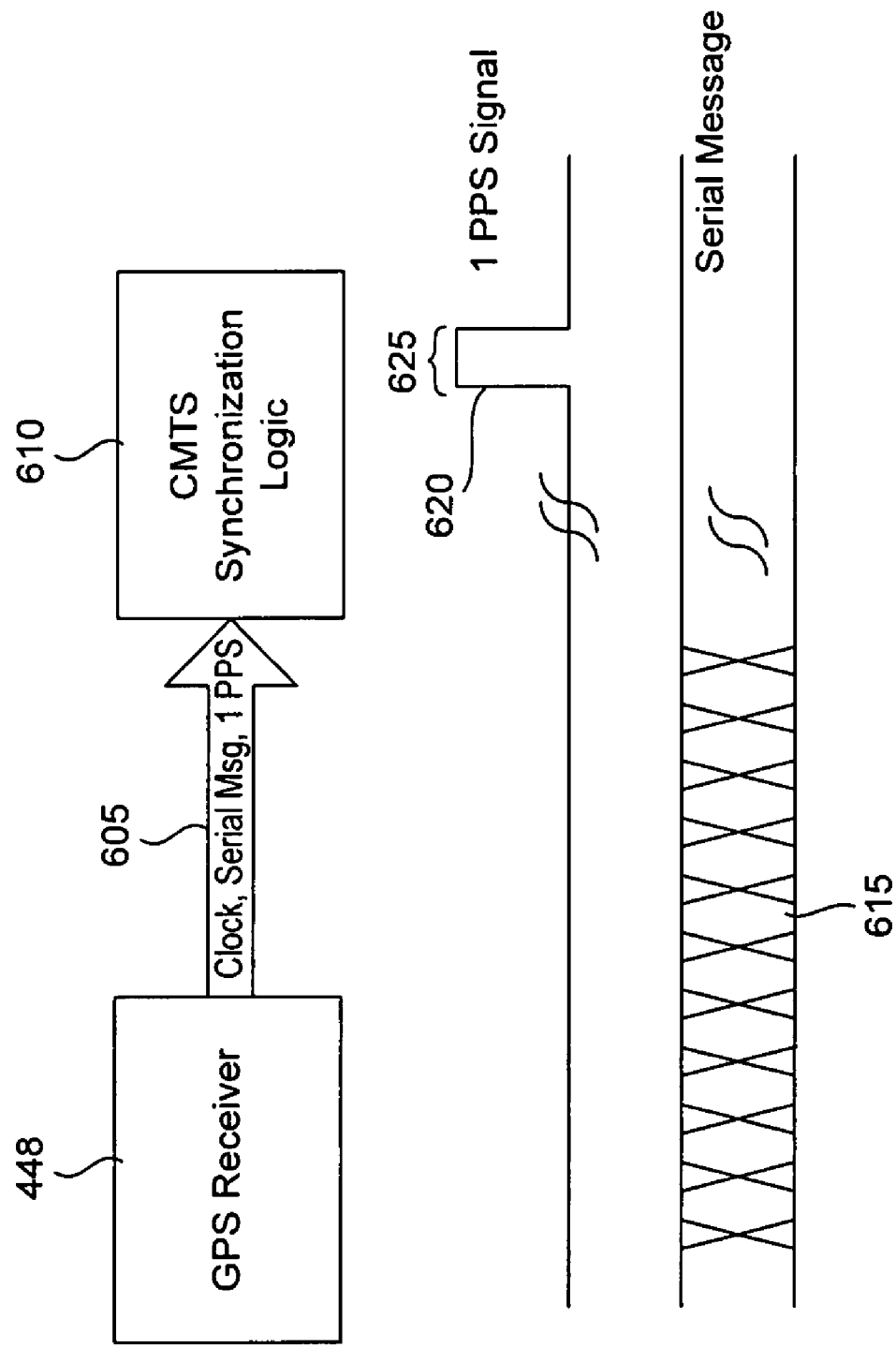
FIG. 6 illustrates the format of data output from a GPS receiver.

FIG. 6 illustrates the format of signals 605 output by a GPS receiver (such as GPS receiver 448 of FIG. 4) to CMTS synchronization logic 610 according to some implementations of the invention. CMTS synchronization logic 610 may be, for example, part of upstream CMTS clock card 446 or of downstream CMTS clock card 457.

Serial message 615 indicates what the time will be on the next rising edge 620 of pulsed signal 625, which is a 1 pulse per second signal in this example. Preferably, the serial message precedes the pulsed signal 625. In this example, signal 605 includes serial message 615 in the following format: "T1#Hxxxxxxxxtflrvcc<cr><lf>." The components of serial message 615 have the following meanings: "T1#H" is a literal message identifier; "xxxxxxxx" is an 8-digit hexadecimal number that indicates the number of seconds elapsed since Jan. 6, 1980; "t" indicates the time figure of merit; "f" is the frequency figure of merit; "l" is the leap second status (l will always be zero for GPS Time); "r" is a request for service message byte; "v" indicates the validity of the message; and "cc" is a checksum for all preceding characters.

As noted above, GPS receiver 448 is preferably configured to outputs signal 605 including GPS time. If signal 605 includes GPS time instead of universal time, CMTS synchronization logic 610 does not need to make an adjustment for leap seconds.

Figure 7:
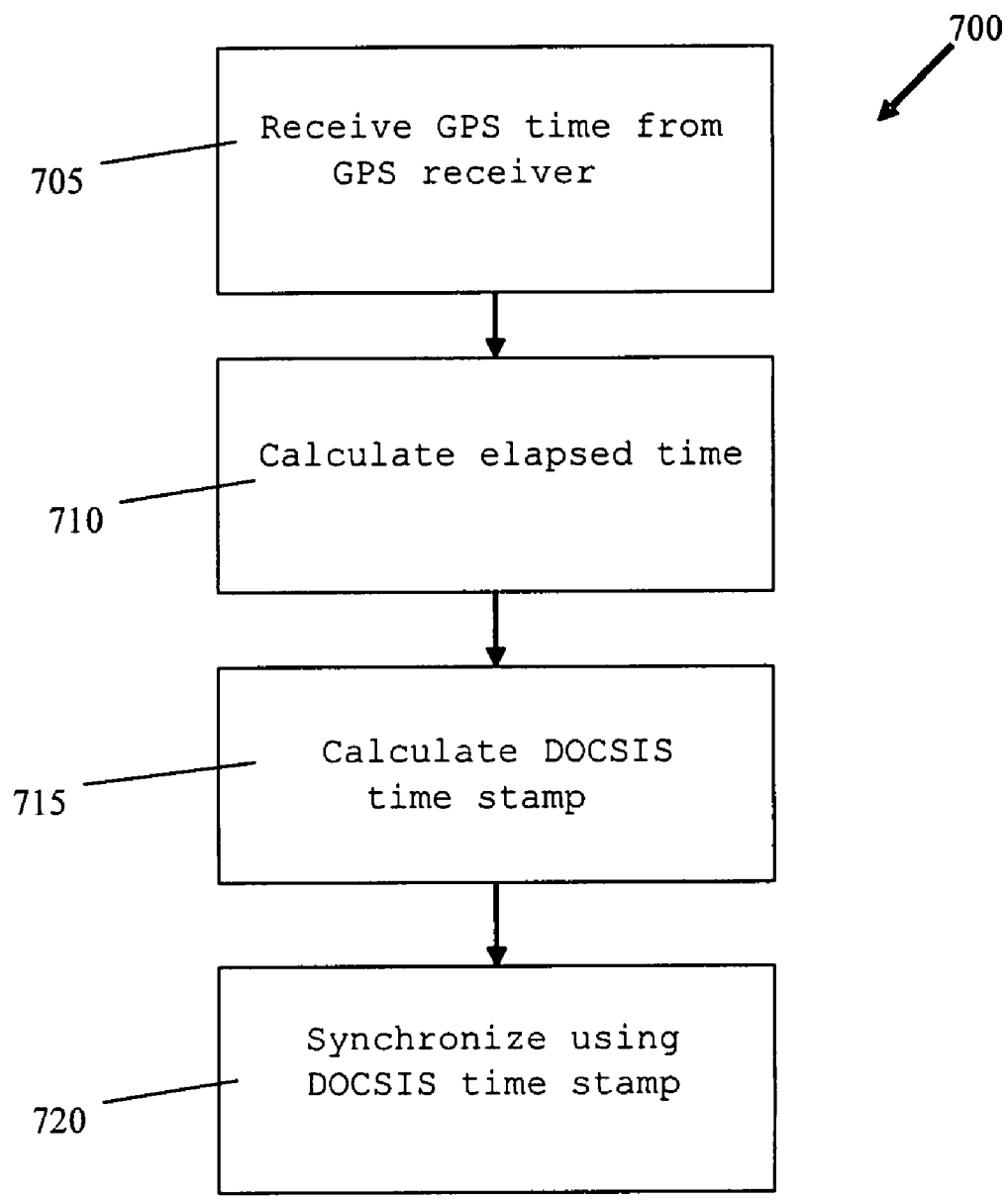
FIG. 7 is a flow chart that illustrates a method for producing a DOCSIS time stamp from GPS time according to one aspect of the present invention.

FIG. 7 is a flow chart that outlines a method according to the present invention. This method may be implemented, for example, by a clock card in an upstream or a downstream CMTS.

In step 705, GPS time is received from a GPS receiver. The GPS time may be, for example, in the format described with reference to FIG. 6, or in another convenient format. In step 710, the elapsed time since the last GPS time is determined. Once the elapsed time is known, the number of times that the DOCSIS timestamp counter has incremented is calculated in step 715 using the following formula:

$$DOCSIS\_Cycles = (Elapsed\ Seconds) * (10.24\ MHz)$$

Preferably, the DOCSIS Timestamp is expressed as "DOCSIS_Cycles[31:0]." The "[31:0]" indicates that the DOCSIS timestamp is represented by a 32 bit binary number with the bits labeled 31 (for the Most Significant Bit ("MSB")) to 0 (for the Least Significant Bit ("LSB")). This is because the DOCSIS timestamp is normally represented in hardware as a 32 bit binary number. Any calculation of elapsed time that would result in a number requiring more than 32 bits to represent would "wrap to zero" at the value of $(2^{32})-1$. In other words, the number the calculation results in is limited to the maximum value that can be represented in the bits available to hold the answer to the calculation—if you calculate something larger than you can hold in a given number of bits, adding 1 to the number ($2^{num\_of\_bits}$) results in the number being 0.

In step 720, the upstream or downstream data are synchronized using the DOCSIS time stamp. For example, a master clock card in a hub that includes many upstream CMTSs may use the calculated DOCSIS time stamp to control a slave clock card in each of the other upstream CMTSs.

Figure 8:
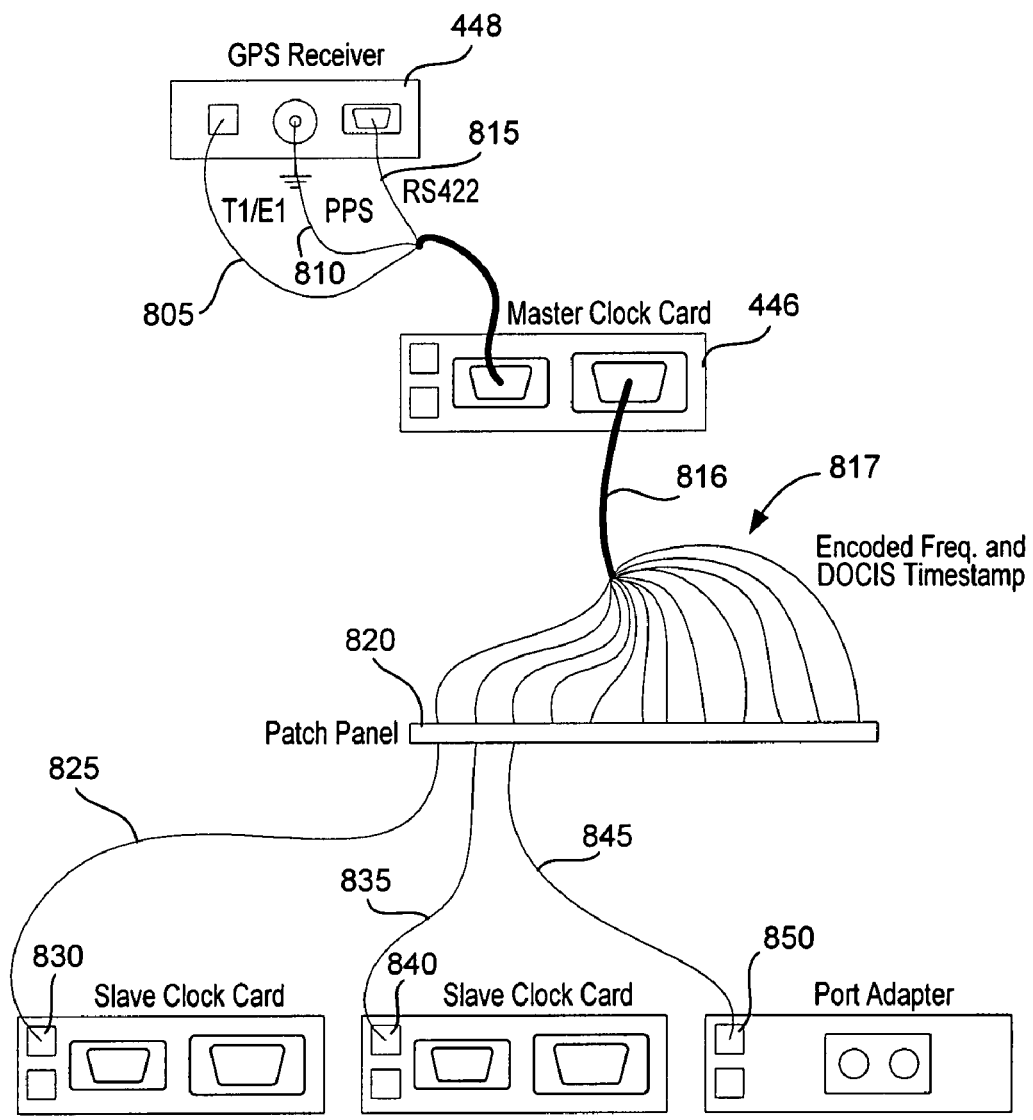
FIG. 8 illustrates clock distribution cabling according to one embodiment of the present invention.

FIG. 8 depicts one such arrangement. Here, GPS receiver 448 outputs time data over lead 805, one pulse per second over lead 810 and serial data (such as serial message 615 described above) over lead 815 to master clock card 446 of upstream CMTS 444.

Connector 816 of master clock card 446, which is preferably a high-density connector, is used to distribute the DOC- SIS timestamp and a frequency reference over "octopus" cable 817, the tentacles of which are wired into patch panel 820. From patch panel 820, leads 825 and 835 (which may be, e.g., single twisted pairs or coaxial cable) are wired into slave clock cards 830 and 840, respectively. Lead 845 is wired into a port adapter of a CMTS that includes clock card functionality, such as a Ferrari™ device. In some embodiments, slave clock cards 830 and/or 840 distribute additional copies of the frequency and timestamp references.

FIG. 9 illustrates one example of timestamp data format 900 for the present invention. In this example, when the link is idle (there is no timestamp message traffic), the system transmits logic ones constantly. When a timestamp data frame is to begin, start bit 905 (here, a single bit of logic zero) is transmitted.

DOCSIS timestamp 910 is transmitted next. Preferably, DOCSIS timestamp 910 is a 32-bit field in MSB first order, as described above. Fields 915 and 920 are single-bit fields used to represent the current state of redundant clock inputs on a clock card. When the bit is set, it indicates the related input is not receiving a clock and data stream. These bits are set if the respective input to the clock card generating the message is found in error—either through errors detected in the messages, no message data present, etc.

In this example, timing master field 925 is a single-bit field that follows the two clock input state bits 915 and 920. Timing master field 925 indicates whether or not the station that sent the timestamp is configured to be a timing master. Next is invalid bit 930 to indicate whether or not the timestamp information is valid, then 4 more bits that follow—all reserved—to even out the message length to the next byte. Preferably, the reserved bits should be ignored when receiving a data stream, and set to a logic '0' when generating a message for transmission.

Next, a 4-bit "regenerator hop count" field 945 is transmitted, MSB first. Field 945 is set to 4'b0000 in the timing master, and each clock regenerator adds 4'b0001 to the value of the field presented to the regenerator logic from the currently active timing source. Field 945 allows a deterministic metric for determining which of two redundant clocking inputs is "closer" to the timing master. This count also allows detection of configuration errors where a maximum specified allowable hop count has been exceeded.

The next part of this exemplary data frame is 8 bits for overall message cyclic redundancy check field ("CRC") 955. The frame ends with a minimum of two stop bits 960, transmitted as logic 1's in this example.

Regardless of network device's configuration (for cable plants or otherwise), it may employ one or more memories or memory modules (e.g., comparable to memory 207a, 215a, etc.) configured to store program instructions for the network operations and other functions of the present invention described herein. The program instructions may specify an operating system and one or more applications, for example. Such memory or memories may also be configured to store data structures, configuration states, information regarding log-in attempts, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to: magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

The logic necessary to implement the methods of the present invention could reside in hardware, software, or some combination of the two. For example, the invention can be implemented in an operating system kernel, in a separate user process, in a library package bound into network applications, on a specially constructed machine, or on a network interface card. Preferably, at least a part of the functionality of this invention is implemented in software as part of an operating system. Such software may be part of MAC layer software or may be closely associated therewith. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device such as a terminal designed to handle network traffic between the terminal and a plurality of network nodes. Such network devices typically have multiple network interfaces.

While the invention has been particularly shown and described with reference to specific embodiments thereof, it will be understood by those skilled in the art that changes in the form and details of the disclosed embodiments may be made without departing from the spirit or scope of the invention. For example, it will be appreciated that the methods of the present invention are not limited to cable networks and may be applied to any access data network that uses at least one shared access communication channel to communicate between a plurality of nodes in the network and a terminal to which the plurality of nodes is connected. Further, it will be appreciated by one having ordinary skill in the art that the technique of the present invention may be implemented in any computer network having a standardized protocol for utilizing a central termination system (e.g. head end) to schedule timeslots for remote stations or nodes on a return (or upstream) channel. In wireless networks, the central termination system may be referred to as a head end or wireless base station. In satellite networks, the central termination system may be referred to as a master controlling station. Therefore, the scope of the invention should be determined with reference to the appended claims.

We claim:

1. A system, comprising:
   a Cable Modem Termination System (CMTS) component operating a Data Over Cable Service Interface Specifications (DOCSIS) Media Access Control (MAC) framer, the CMTS component exchanging data between a first access network and a second cable network, the DOCSIS MAC framer configured to frame communications received over the first access network into a DOCSIS format before communicating those DOCSIS framed communications over a variable delay packet switched portion of the second cable network;
   wherein the DOCSIS MAC framer is configured to insert DOCSIS timestamps obtained from a local counter of the CMTS component in conjunction with the framing, the DOCSIS timestamps usable for frequency locking downstream cable modems with the CMTS component;

synchronization circuitry on the CMTS component, the synchronization circuitry configured to extract a time value from a Global Positioning System (GPS) message, to process the extracted time value to generate a DOCSIS timestamp, and to synchronize the local counter to the generated DOCSIS timestamp according to a GPS pulse associated with the serial GPS message; and a hub containing a Quadrature Amplitude Modulator (QAM) and being located remotely from the CMTS component and separated from the CMTS component by the variable delay packet switched portion of the second cable network, the hub configured to receive the DOCSIS framed communications over the variable delay packet switched portion of the second cable network, the hub configured to quadrature amplitude modulate the DOCSIS framed data for sending on a constant delay portion of the second cable network;

wherein the hub is configured to replace the DOCSIS timestamps as the DOCSIS framed communications are introduced into the constant delay portion of the second cable network according to a local counter of the hub, wherein said local counter of the hub is synchronized according to a GPS input at the GPS pulse, and wherein said DOCSIS timestamp replacement by the hub maintains the frequency lock between the CMTS component and the downstream cable modems regardless of the variability and length of delays associated with transmitting the DOCSIS framed communications between the CMTS component and the hub.

2. The system of claim 1, wherein the hub is further configured to:

remove the DOCSIS timestamps included in the DOCSIS framed communications; and replace the DOCSIS timestamps with new DOCSIS timestamps obtained according to the local counter of the hub.

3. The system of claim 1, wherein the counters are synchronized independently of any synchronization messages exchanged over the packet switched portion of the second cable network.

4. The system of claim 3, wherein the synchronization independently of the packet switched portion of the second cable network allows the hub and the CMTS component to be separated by any number of packet switching devices and any physical distance without disruption of the frequency lock between the CMTS component and the cable modems.

5. The system of claim 1, wherein the packet switched portion of the second cable network is an Internet Protocol (IP) network, and the system further comprises switches or routers operating between the CMTS component and the hub.

6. The system of claim 1, wherein the synchronization circuitry is further configured to:

determine an elapsed time difference between the extracted time value and a previous GPS time value;

multiply the elapsed time difference by 10.24; and synchronize the local counter of the CMTS component according to the product.

7. The system of claim 1, wherein synchronization of the local counters at the same GPS pulse allows the CMTS component and the cable modems to decode and process, respectively, upstream and downstream modulated data independently of the physical proximity of the hub and the CMTS component.

8. A system, comprising:

a hub containing a Quadrature Amplitude Modulator (QAM) and Being located remotely from a Cable Modem Termination System (CMTS) component and separated from the CMTS component by a variable delay packet switched portion of a cable network, the hub configured to receive Data Over Cable Service Interface Specifications (DOCSIS) framed communications from the CMTS over the variable delay packet switched portion of the cable network, the hub configured to quadrature amplitude modulate the DOCSIS framed data for sending on a constant delay portion of the cable network to a plurality of downstream cable modems;

wherein the hub is configured to replace DOCSIS timestamps in the DOCSIS framed communications with new values obtained from a local counter prior to introducing the data onto the constant delay portion of the second cable network; and wherein said local counter of the hub is synchronized according to a same reference Global Positioning System (GPS) time value that is used to synchronize a counter on the remote CMTS component.

9. The system of claim 8, wherein said DOCSIS timestamp replacement with the new values maintains a frequency lock between the CMTS component and the downstream cable modems regardless of the variability and length of delays associated with transmitting the DOCSIS framed communications from the remote CMTS component to the hub.

10. The system of claim 8, further comprising:

a DOCSIS Media Access Control (MAC) framer located in the CMTS component, the DOCSIS MAC framer configured to frame communications received over an access network into a DOCSIS format before communicating those DOCSIS framed communications over the variable delay packet switched portion of the cable network.

11. The system of claim 10, wherein the DOCSIS MAC framer is configured to insert time values obtained from the CMTS component's counter in conjunction with the framing, the time values usable for frequency locking downstream cable modems with the CMTS component.

12. The system of claim 11, further comprising:

synchronization circuitry on the CMTS component, the synchronization circuitry configured to extract a time value from a Global Positioning System (GPS) message, to process the extracted time value to generate a reference DOCSIS timestamp, and to synchronize the CMTS component's counter to the generated reference DOCSIS timestamp according to a GPS pulse associated with the GPS message;

wherein the CMTS component's counter is synchronized in unison with the hub's counter at the GPS pulse.

13. The system of claim 8, wherein the counters are synchronized in unison to the same reference GPS time value independently of any synchronization messages exchanged over the packet switched portion of the cable network.

14. The system of claim 13, wherein the synchronization independently of the packet switched portion of the cable network allows the hub and the CMTS component to be separated by any number of packet switching accruements and any physical distance without disruption of the frequency lock between the CMTS component and the cable modems.

15. The system of claim 8, wherein the packet switched portion of the cable network is an Internet Protocol (IP) network, and the system further comprises switches or routers operating between the CMTS component and the hub.

16. The system of claim 8, wherein the CMTS component is configured to:

determine an elapsed time difference between the reference GPS time value and a previously received reference GPS time value;

multiply the elapsed time difference by 10.24; and synchronize the local counter of the CMTS component according to the product.

17. A system, comprising:

a Cable Modem Termination System (CMTS) component operating a Data Over Cable Service Interface Specification (DOCSIS) Media Access Control (MAC) framer, the CMTS component exchanging data between a first access network and a second cable network, the DOCSIS MAC framer configured to frame communications received over the first access network into a DOCSIS format before communicating those DOCSIS framed communications over a variable delay packet switched portion of the second cable network;

wherein the CMTS component is configured to send the DOCSIS framed communications over the packet switched portion of the second cable network for remote quadrature amplitude modulation, and wherein the processes of DOCSIS framing and quadrature amplitude modulating the DOCSIS framed communications are distributed across the packet switched portion of the second cable network; and synchronization circuitry on the CMTS component, the synchronization circuitry configured to extract a reference time value from a Global Positioning System (GPS) message, to process the extracted time value to generate a reference DOCSIS timestamp, and to synchronize a local counter to the generated DOCSIS timestamp according to a GPS pulse associated with the GPS message;

wherein the CMTS component is configured to insert the DOCSIS timestamps obtained from the local counter of the CMTS component in conjunction with the framing, the DOCSIS timestamps usable for frequency locking downstream cable modems with the CMTS component.

18. The system of 17, further comprising:

a hub containing a Quadrature Amplitude Modulator (QAM) and being located remotely from the CMTS component and separated from the CMTS component by the variable delay packet switched portion of the second cable network, the hub configured to receive DOCSIS framed communications over the variable delay packet switched portion of the second cable network, the hub configured to quadrature amplitude modulate the DOCSIS framed data for sending on a constant delay portion of the second cable network;

wherein the hub is configured to replace the DOCSIS timestamps as the DOCSIS framed communications are introduced into the constant delay portion of the second cable network according to a local counter of the hub, wherein said local counter of the hub is synchronized in unison with the local counter of the CMTS component at the GPS pulse.

19. The system of claim 18, wherein said DOCSIS timestamp replacement by the hub maintains the frequency lock between the CMTS component and the downstream cable modems regardless of the variability and length of delays associated with transmitting the DOCSIS framed communications between the CMTS component and the hub.

20. The system of claim 17, wherein the local counter is synchronized at the GPS pulse in unison with a remote counter located on a remote hub configured to perform the quadrature amplitude modulation.

21. The system of claim 17, wherein the local counter is synchronized at the GPS pulse in unison with a remote counter located on a remote upstream CMTS component.

22. A system, comprising:

a Cable Modem Termination System (CMTS) component operating a Data Over Cable Service Interface Specification (DOCSIS) Media Access Control (MAC) framer, the DOCSIS MAC framer configured to frame communications received over a first access network into a DOCSIS format before communicating those DOCSIS framed communications over a variable delay packet switched portion of a second cable network;

wherein the CMTS component is configured to send the DOCSIS framed communications over the packet switched portion of the second cable network for remote quadrature amplitude modulation; and synchronization circuitry on the CMTS component, the synchronization circuitry configured to synchronize a counter used for DOCSIS time-stamping the framed communications with another counter used to replace the DOCSIS timestamps with new values after transmission over the packet switched portion of the second cable network, and wherein the counters are synchronized according to a Global Positioning System (GPS) input.

23. The system of claim 22 wherein the counters are synchronized to a same DOCSIS time value.

24. The system of claim 22, further comprising a remote hub configured to replace the DOCSIS timestamp values according to the another counter and quadrature amplitude modulate the DOCSIS framed communications.

25. The system of claim 24, wherein the remote hub contains an upstream CMTS.

26. The system of claim 22, wherein the synchronization of the counters is based on out of band communications such that variable delays associated with the packet switched portion of the second cable network do not disrupt synchronization, and wherein the out of band communications include GPS messages transmitted to the CMTS component and a remote hub over a different path than a path used for sending the DOCSIS framed communications from the CMTS component to the remote hub.

* * * * *

UNITED STATES PATENT AND TRADEMARK OFFICE
CERTIFICATE OF CORRECTION

PATENT NO. : 7,583,704 B1
APPLICATION NO. : 10/459136
DATED : September 1, 2009
INVENTOR(S) : Walker et al.

It is certified that error appears in the above-identified patent and that said Letters Patent is hereby corrected as shown below:

At column 12, line 56, please replace "Specifications" with --Specification--.
At column 13, line 9, please replace "the serial GPS message" with --the GPS message--.
At column 13, line 67, please replace "and Being located" with --and being located--.
At column 14, line 5, please replace "Specifications" with --Specification--.
At column 14, line 38, please replace "locking downstream" with --locking the downstream--.
At column 15, line 46, please replace "to receive DOCSIS" with --to receive the DOCSIS--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,583,704 B1 Page 1 of 1
APPLICATION NO. : 10/459136
DATED : September 1, 2009
INVENTOR(S) : Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1435 days.

Signed and Sealed this

Fourteenth Day of December, 2010

David J. Kappos
*Director of the United States Patent and Trademark Office*